May 24, 1932.  J. P. NIKONOW  1,859,933
LIQUID LEVEL INDICATOR
Filed Nov. 8, 1929
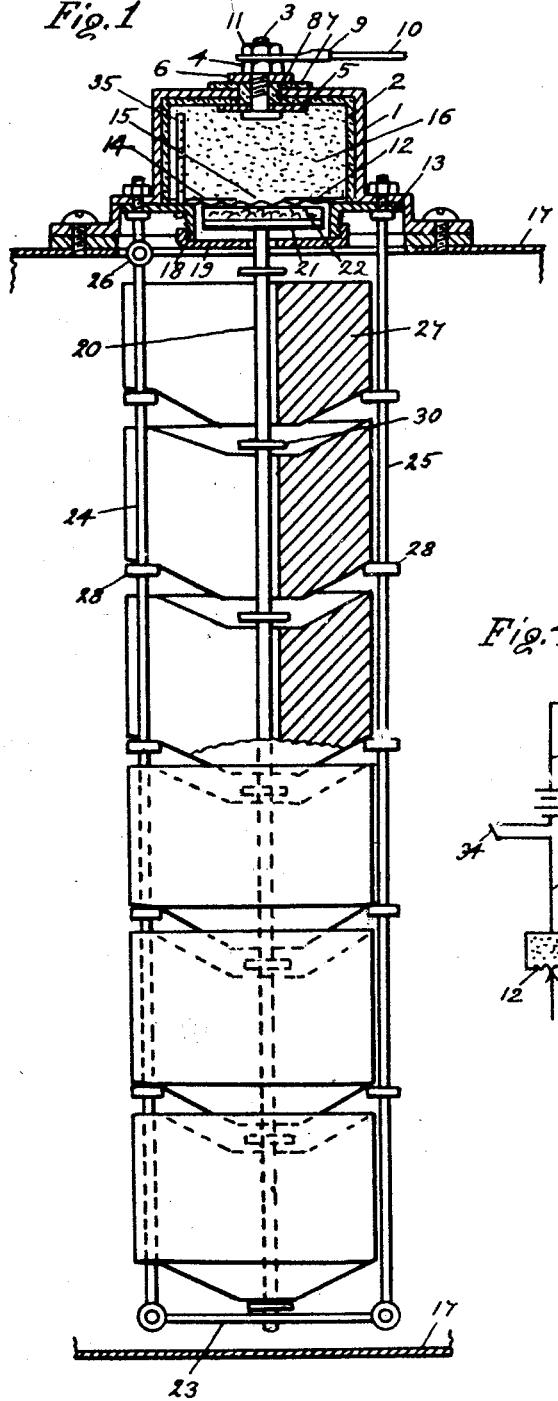
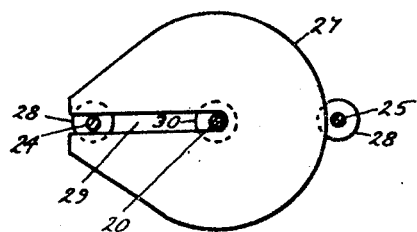
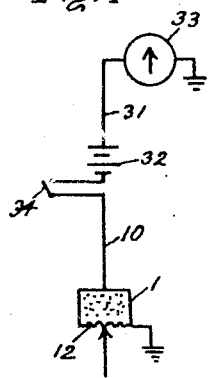
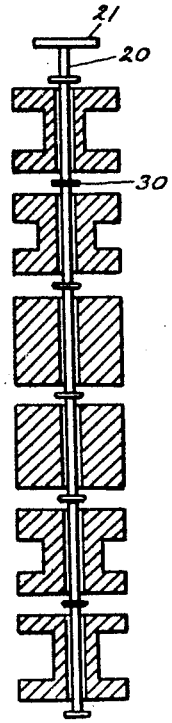
John P. Nikonow
INVENTOR Patented May 24, 1932

1,859,933

UNITED STATES PATENT OFFICE

JOHN P. NIKONOW, OF NEW YORK, N. Y.

LIQUID LEVEL INDICATOR

Application filed November 8, 1929. Serial No. 405,768.

My invention relates to liquid level indicators and has a particular reference to indicators using floats in connection with variable electrical resistance, the current variations being proportional to the hydrostatic pressure.

For this purpose I use a powdered or granulated conducting material, such as carbon or graphite, placed in a suitable container between two electrodes, one of which forms a flexible diaphragm. This diaphragm is acted upon by a series of floats, each float becoming operative at a certain height of the liquid in the tank where it is desired to measure the height of this liquid. With this arrangement the pressure on the resistor is proportional to the number of floats submerged or to the height of the liquid.

My invention is more fully described in the accompanying specification and drawings in which—

Fig. 1 is a sectional elevation of my indicator, Fig. 2 is a plan view of a float showing also method of its support, Fig. 3 is a modified construction of the floats, and Fig. 4 is a diagrammatic view showing electrical connections.

My indicator consists of a case or housing 1 lined with an insulation 2 inside. A terminal screw 3 is fastened in the wall of the case by a nut 4 and has metal washers 5 and 6. It is insulated by an insulating washer 7 and a bushing 8. A terminal 9 of an insulated wire 10 is clamped with a nut 11. The case 1 is closed underneath with a flexible diaphragm 12 which is made preferably of a thin soft metal sheet and is corrugated to allow for a greater flexibility. It is attached to a bottom plate 13 which is grounded or otherwise forms a part of the electric circuit. The space inside of the case 1 is filled with a powdered and granulated (or both) conducting material, preferably carbon. The diaphragm 12 is covered inside with an insulating sheet 14 made of a flexible material and provided with a central aperture 15 so as to increase the effective resistance of the carbon powder in the case.

For the same purpose the carbon powder 16 can be mixed with some insulating or highly resistant material, such as carborundum, silica etc.

The case 1 is attached to the top of a tank 17 in which it is desired to measure the height of the liquid. The bottom plate 13 has a tubular projection 18 closed with a cap 19 with a central aperture for a float stem 20. The upper end of this stem has a metal disc 21 adapted to press against the diaphragm 12. A soft and resilient washer 22 is placed between the disc 21 and the diaphragm 12 in order to distribute the pressure from the stem evenly over the diaphragm. The washer 22 can be made of rubber or felt. The chamber formed by the diaphragm and the cap 19 is of a sufficient size to permit a certain freedom of vertical movement for the stem 20 with the disc 21 and washer 22.

The lower end of the stem is slidably supported in the bottom bar 23 attached with its ends to guiding rods 24 and 25 fastened with their upper ends to the sides of the case 1. The rod 24 has a hinge 26 at the top so as to facilitate the assembling of the floats 27. The rods 24 and 25 have supporting washers or shoulders 28 adapted to support the floats 27 at regular intervals from the bottom to the top of the tank 17. They are provided with slots 29 loosely fitting over the stem 20.

The stem 20 has washers or bushings 30 so arranged that they do not touch the floats in any positions of the stem 20 when the floats rest on the washers 28.

The floats are made smaller than the distance between consecutive washers 28 so that they can be moved up and down between these washers.

The floats can be made of any suitable material, such as cork, balsa wood, or they can be made hollow to increase their buoyancy.

The carbon resistor in the cage 1 forms an electric circuit with the wires 10 and 31 for a battery 32. The strength of the current is measured by a suitable electric meter 33 which can be an ordinary milliammeter or galvanometer calibrated in units of height of the liquid in the tank or in units of volumetric content.

A switch 34 may be provided in order to disconnect the battery when the indicator is not used. This switch can be interconnected with the ordinary ignition switch on an automobile so that the indicator will operate only when the ignition switch is closed.

The operation of my indicator is as follows.

The meter 33 is adjusted to indicate "zero" when there is no liquid in the tank. For this purpose the spring of the meter pointer can be set so that the pointer will be pressed against the stop at the zero mark for the current which passes through the system when there is no pressure applied to the resistor, and will move upon the dial only for stronger currents.

With no liquid in the tank all floats rest on the washers 28 so that the stem 20 hangs free supported on the bar 23 or on the plate 19 with its disc 21.

When the liquid is poured in the tank the first or bottom float 27 will rise on it pressing against the washer 30 and pushing the stem 20 up. The stem accordingly will exert a pressure on the diaphragm 12 through the elastic washer 22. Under this pressure the resistance of the carbon powder 16 will be lowered, a stronger current will flow causing the pointer of the meter 33 to move.

The volumetric compressibility of the carbon powder 16 being insignificant as it is tightly packed during its assembling, the float will stop in its raised position continuing to press the stem against the diaphragm, without touching the next washers 28.

When more liquid is poured in the tank the float will gradually increase its pressure until it is fully covered by liquid, after that its pressure will remain constant. With further rise of the liquid level the next float will become operative, its pressure adding to the pressure from the first float. In order to obtain a gradual and continuous increase in pressure the floats are made of a concave-convex shape as shown, so that before the first float is fully submerged, the next float begins to act.

The maximum pressure from each float is proportional to its buoyancy or displacement. It is possible therefore to vary this pressure by changing the shape of the floats. Fig. 3 shows an arrangement in which the bulk of the floats progressively increases from the ends to the middle so that, for the same height of liquid, the pressure at the ends is lighter than in the middle. This permits the use of a meter with equal divisions on its dial for use with oval or round tanks.

In order to equalize the pressure in the tank and in the case 1 a pipe 35 is inserted in the case from the plate 13 with a number of small holes. Any pressure or vacuum in the tank, therefore, is also communicated to the inside space in the case 1 between the granules of the carbon 16 thereby relieving the diaphragm from the effects of this pressure.

The voltage of an ordinary storage battery as used on automobiles is sufficiently constant for ordinary purposes. If very accurate readings are wanted, however, it is possible to provide some of the well known means for rendering the meter readings independent of the voltage variations, for instance, by introducing a Wheatstone bridge.

I claim as my invention:

In a liquid level indicator, the combination with guiding bars adapted to be supported in a tank, of a rod slidably supported between said guiding bars, a plurality of projections on said guiding bars, a plurality of floats slidably supported between said bars and adapted to rest on said projections, said floats being adapted to slide over said rod, a plurality of projections on said rod adapted to be actuated by said floats when said floats are successively raised by a liquid in said tank, a pressure actuated element, the end of said rod being adapted to engage said pressure element, said floats being adapted to transmit pressure to said element through said projections of said rod, said pressure being proportional to the number of floats in contact with said liquid, and means to measure the height of said liquid by measuring the variable pressure on said element.

In testimony whereof I affix my signature.

JOHN P. NIKONOW.